United States Patent [19]

Bauer

[11] Patent Number: 4,468,236

[45] Date of Patent: Aug. 28, 1984

[54] APPARATUS AND METHOD FOR MONITORING THE SERVICE LIFE OF ADSORPTION CARTRIDGES USED FOR DESICCATING AND/OR CLEANSING MOIST PRESSURIZED AIR

[75] Inventor: Heinz Bauer, Munich, Fed. Rep. of Germany

[73] Assignee: Bauer Kompressoren GmbH, Munich, Fed. Rep. of Germany

[21] Appl. No.: 415,814

[22] Filed: Sep. 8, 1982

[30] Foreign Application Priority Data

Sep. 9, 1981 [DE] Fed. Rep. of Germany ....... 3135732

[51] Int. Cl.³ .............................................. B01D 53/04

[52] U.S. Cl. .......................................... 55/20; 55/35; 55/162; 55/163; 55/275

[58] Field of Search ................. 55/20, 35, 74, 75, 162, 55/163, 274, 275, 387, 389

[56] References Cited

U.S. PATENT DOCUMENTS

| | | | |
|---|---|---|---|
| 1,863,656 | 6/1932 | Hartman | 55/162 |
| 1,986,814 | 1/1935 | Hartman | 55/162 |
| 2,328,521 | 8/1943 | Wittmann | 55/163 |
| 2,561,441 | 7/1951 | Lou | 55/163 |
| 2,783,547 | 3/1957 | Bieger et al. | 55/162 X |
| 3,144,314 | 8/1964 | Jackson | 55/275 X |
| 3,715,866 | 2/1973 | Chatlos et al. | 55/275 X |
| 3,773,044 | 11/1973 | Wallace | 55/275 X |
| 4,197,095 | 4/1980 | White, Jr. et al. | 55/275 X |
| 4,351,649 | 9/1982 | Owens et al. | 55/275 X |

*Primary Examiner*—Robert H. Spitzer
*Attorney, Agent, or Firm*—Hauke and Patalidis

[57] ABSTRACT

An apparatus for monitoring the service life of adsorption cartridges used for desiccating moist pressurized air or for purifying pressurized air by removing harmful substances therefrom. The apparatus includes a timepiece for counting the operating hours. The speed of the timpiece is adjusted in accordance with the temperature of the pressurized air to be filtered.

6 Claims, 1 Drawing Figure

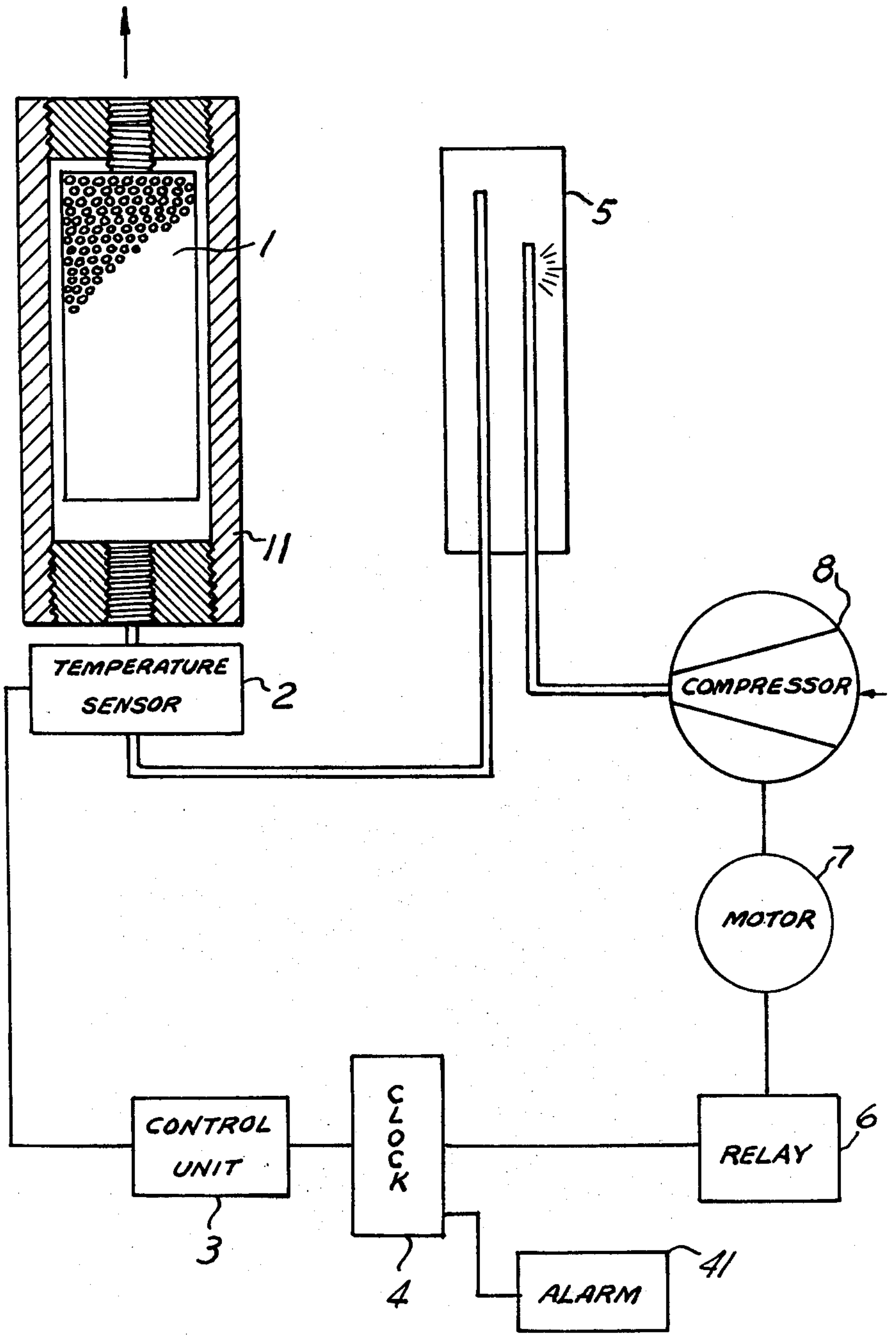
1
5
11
8
TEMPERATURE SENSOR
2
COMPRESSOR
MOTOR
7
CONTROL UNIT
CLOCK
RELAY
6
3
4
ALARM
41

APPARATUS AND METHOD FOR MONITORING THE SERVICE LIFE OF ADSORPTION CARTRIDGES USED FOR DESICCATING AND/OR CLEANSING MOIST PRESSURIZED AIR

BACKGROUND OF THE INVENTION

The invention relates to an apparatus and method for monitoring the service life of adsorption cartridges which desiccate and/or cleanse moist pressurized air of harmful substances, such as carbon oxides, aromatic hydrocarbons, hydrogen sulfide, and the like, and wherein the apparatus includes a timepiece for counting the operating hours.

Filters used in compressed air systems must be periodically serviced. The servicing not only involves the draining of the condensate, which is usually done automatically, but also the changing of the filter cartridges which, after a certain period of operation, i.e., at the end of their service life, have deteriorated to the point of ineffectiveness. The cartridges in question may be those of the desiccant type used exclusively for the removal of moisture from the pressurized air, or they may be cartridges of the cleansing type used for separating harmful substances.

It is of vital importance, especially in the case of high-pressure type compressors used for filling respirator bottles with air, that the adsorption cartridges be replaced in due time, because a deteriorated filter cartridge is not effective in filtering out the harmful substances from the pressurized air. With systems of the known type, replacement of the adsorption cartridge takes place after a certain operating period specified by the manufacturer. In order to be on the safe side, the life of such an adsorption cartridge specified by the manufacturer is determined on the basis of the most unfavorable operating conditions. The disadvantage of this procedure is that in many instances the adsorption cartridges are replaced long before the end of their useful life, because the cartridges have been used under conditions much more favorable than those assumed by the manufacturer in determining the maximum permissible service life. One important factor in determining the useful life of such an adsorption cartridge is the moisture content of the pressurized air being filtered, because the common adsorption materials, preferably activated carbon, after being saturated with moisture, are not effective to separate the aforementioned harmful substances. The same is true of desiccant cartridges which are only effective as long as they are not saturated with moisture.

SUMMARY OF THE INVENTION

It is the object of the present invention to provide an apparatus in which the moisture content of pressurized air being desiccated or cleansed is considered in determining the maximum permissible service life of the adsorption cartridge, so that the actual capacity of an adsorption cartridge, in terms of useful life, can be used to full advantages. The apparatus according to the invention is relatively simple in structure and yet offers a high degree of operational reliability while requiring very little maintenance.

In accomplishing this object, the invention is based on the recognition that the moisture content in highly pressurized air generally corresponds to 100% humidity or saturation. Therefore, the absolute quantity of water vapor in the pressurized air depends only on the temperature of the air.

Thus, the higher the temperature of the moist pressurized air, the faster the timepiece counting the operating hours will be running and, consequently, the sooner the maximum permissible operating time to which the timepiece has been set will lapse. If low temperature conditions prevail, only relatively little moisture will penetrate into the adsorption material, and the slower speed at which the counter is running due to the lower temperature will result in an extended service life, which is justifiable and which will considerably increase the efficiency of the system inasmuch as the adsorption cartridges are used to their maximum potential.

Monitoring devices for adsorption cartridges by which the moisture content of the air is measured are known in the art. However, these devices operate on the principle of comparison, i.e., moisture measured at the outlet of the adsorption cartridge is compared with moisture at the inlet of the adsorption cartridge, and on the basis of the difference a determination is made as to what amount of the moisture became trapped in the cartridge. This method is not only unreliable, due to the fact that the temperature of the pressurized air may be subject to change while flowing through the adsorption cartridge, but it is also undesirable, because the adsorption material changes from an unsaturated state to a saturated state very rapidly with the result that the moisture value at the outlet changes very rapidly, and, therefore, an adsorption cartridge has already reached the state of saturation before a determination is made to that effect. As a result, at least a small amount of air charged with harmful substances has already flowed into the filling system, or an amount of unduly moist air has passed through the system.

According to another advantageous feature of this invention, the timepiece is provided with optical or acoustical warning devices, or with an automatic shutoff device, which are actuated at a predetermined time prior to the elapse of the maximum service life of the adsorption cartridge. The incorporation of such a warning device into the apparatus according to the invention can be accomplished by relatively simple means and constitutes an additional safety factor ensuring that the adsorption cartridges are replaced in due time.

One exemplary embodiment of the invention will be described with reference to the accompanying drawing wherein:

BRIEF DESCRIPTION OF THE DRAWING

The single FIGURE of the drawing illustrates schematically a portion of a circuit of a compressed air system, which is restricted basically to the area of the filter station.

DETAILED DESCRIPTION OF THE PREFERRED EMBODIMENT

After being compressed by a compressor 8 driven by a motor 7, the pressurized air flows through an oil separator 5 and from there into a filter unit 11 containing an adsorption cartridge 1. In the filter housing 11 the pressurized air is guided so that it is forced to flow through the adsorption cartridge 1 prior to exiting from the filter housing. As a rule, the adsorption cartridge 1 contains activated carbon as adsorption material and/or silica gel and/or a molecular screen. In accordance with the invention, there is provided at the inlet of the filter housing 11 a temperature sensor 2 which measures the temperature of the pressurized air entering the filter unit 11 and supplies a signal representing the temperature value to a control unit 3. The control unit 3, in turn, adjusts the speed of a timepiece 4 counting the operating hours, which is usually in the form of a clock with negative time indication. The speed adjustment of the timepiece 4 is effected on the basis of a previously established function set up in the control unit which causes the hour counter to run faster at a higher temperature and slower at a lower temperature. As a rule, the timepiece 4 counting the operating hours is provided with a dial which indicates when the previously set operating period has elapsed. As provided in the exemplary embodiment, an optical or acoustical warning device may be added to the system which is actuated at the end of or, if desired, a certain time before the end of, the previously established operating period. A warning device of this type is indicated in the drawing by the reference numeral 41. As an alternative to or in combination with the warning device there may be provided a safety circuit, whereby at the end of the permissible operating period, or at a certain time prior therto, a signal is transmitted via relay 6 to the electric motor 7 so that the system is shut off.

Having thus described the present invention by way of typical structural embodiments thereof, modifications whereof will be apparent to those skilled in the art, what is claimed as new is as follows:

1. An apparatus for monitoring the service life of a filter cartridge wherein highly pressurized air flows through said filter cartridge from an inlet thereof to an outlet thereof said apparatus comprising a variable speed timepiece, a single temperature sensor disposed at said inlet of said filter cartridge for measuring the temperature of the air entering said filter cartridge, and a control means for said timepiece connected to said temperature sensor whereby said control means adjusts the speed of said timepiece as a function of said temperature of said air entering said filter cartridge.

2. The apparatus of claim 1 further comprising said timepiece being provided with warning means actuated at a predetermined time prior to the end of the service life of said cartridge.

3. The apparatus of claim 1 further comprising automatic shut-off means for stopping the flow of pressurized air through said cartridge at a predetermined time prior to the end of the service life of said cartridge.

4. A method for monitoring the service life of a filter cartridge wherein highly pressurized air flows through said filter cartridge from an inlet thereof to an outlet thereof, said method comprising disposing a single temperature sensor at said inlet of said filter cartridge for measuring the temperature of the highly pressurized air entering said inlet of said filter cartridge, and controlling the speed of operation of a variable speed timepiece as a function of said temperature.

5. The method of claim 4 further comprising shutting off the flow of pressurized air through said cartridge at a predetermined time prior to the end of the service life of said cartridge.

6. The method of claim 4 further comprising providing a warning at a predetermined time prior to the end of the service life of said cartridge.

* * * * *